United States Patent
Puranik et al.

(10) Patent No.: US 10,851,610 B2
(45) Date of Patent: Dec. 1, 2020

(54) BOP SINGLE-PIECE REPLACEABLE INSERT

(71) Applicant: Worldwide Oilfield Machine, Inc., Houston, TX (US)

(72) Inventors: Sudhir Shrivallabh Puranik, Houston, TX (US); Mansing Mohan Phase, Houston, TX (US); Kauntey Suresh Angal, Houston, TX (US)

(*) Notice: Subject to any disclaimer, the term of this patent is extended or adjusted under 35 U.S.C. 154(b) by 0 days.

(21) Appl. No.: 16/288,497

(22) Filed: Feb. 28, 2019

(65) Prior Publication Data
US 2019/0271207 A1    Sep. 5, 2019

Related U.S. Application Data

(63) Continuation-in-part of application No. 15/909,307, filed on Mar. 1, 2018, now Pat. No. 10,683,722.

(60) Provisional application No. 62/771,713, filed on Nov. 27, 2018.

(51) Int. Cl.
*E21B 33/06* (2006.01)
*F16K 1/46* (2006.01)
*F16K 1/42* (2006.01)

(52) U.S. Cl.
CPC ............ *E21B 33/062* (2013.01); *F16K 1/422* (2013.01); *F16K 1/46* (2013.01)

(58) Field of Classification Search
CPC .......... F16K 1/422; F16K 1/46; E21B 33/062
See application file for complete search history.

(56) References Cited

U.S. PATENT DOCUMENTS

| | | | |
|---|---|---|---|
| 1,908,221 A | 5/1933 | Church | |
| 2,760,751 A | 8/1956 | Wilde | |
| 4,444,404 A | 4/1984 | Parks, Jr. | |
| 5,064,164 A * | 11/1991 | Le | E21B 33/062 251/1.1 |
| 10,161,212 B2 * | 12/2018 | Araujo et al. | E21B 33/062 |
| 10,233,715 B2 * | 3/2019 | Zonoz et al. | E21B 33/06 |
| 2017/0167219 A1 * | 6/2017 | Wang et al. | E21B 33/062 |

* cited by examiner

*Primary Examiner* — Kevin L Lee
(74) *Attorney, Agent, or Firm* — Kenneth L. Nash; Thomas D. Nash (57) ABSTRACT

A replaceable seat seal is used to form a replaceable portion of the ram cavity in a BOP that allows the upper central portion of the ram cavity to be replaced when wear occurs. A method is provided to produce a BOP that with a replaceable portion of the ram cavity. The single piece insert, also referred to as a single insert, utilizes only the single insert to repair the BOP as compared to another design that comprised a top insert, bottom insert, and two side inserts. The top insert of the prior art is comparable in construction and mounting position to the single insert.

18 Claims, 6 Drawing Sheets

BOP SINGLE-PIECE REPLACEABLE INSERT

The instant application is a continuation-in-part of U.S. application Ser. No. 15/909,307, filed Mar. 1, 2018, now U.S. Pat. No. 10,683,722. The instant application also claims the benefit of U.S. Provisional Application No. 62/771,713, filed Nov. 27, 2018.

BACKGROUND OF THE INVENTION

Field of the Invention

The present invention relates generally to used blowout preventers that must be repaired and refurbished and more particularly to a replaceable single piece replaceable insert that may be used instead of the prolonged process of repair of BOP bodies. However, the present invention could also be utilized in new blowout preventers to provide a single piece replaceable insert that can be changed at the location.

Background of the Invention

A blowout preventer (BOP) is a large, specialized valve or similar mechanical device, used to seal, control and monitor oil and gas wells to prevent blowouts, the uncontrolled release of crude oil and/or natural gas from a well. They are usually installed redundantly in stacks.

The BOP housing (body) has a vertical well bore or throughbore and a horizontal ram cavity (ram guide chamber). Opposing rams (plungers) in the ram cavity translate horizontally to overcome downhole pressures and seal the throughbore.

At the end of the lifetime of a blowout preventer, numerous problems may exist in the body of the BOP, which prevent the rams from sealing within the BOP body.

An extensive and prolonged process of Machining, Welding, Pre and Post Heat Treatment is required for successful repair and refurbishment of the used U type or Universal type Ram BOP. To refurbish a BOP body requires a lengthy process of almost 45 days of machining, welding, pre and post heat treatment to bring the body back to operative condition excluding the time consumed in transportation. Also, there is high chance of crack development if the procedure is not followed properly, directly affecting the performance of refurbished BOP.

Accordingly, those of skill in the art will appreciate the present invention which allows skipping the entire prolonged repair and refurbishing process while ensuring even higher performance level of the equipment.

SUMMARY OF THE INVENTION

One object of the present invention is to provide a single replaceable insert within a ram cavity for a BOP to either repair a BOP or to provide a new BOP with an easy way to repair leaks when the BOP is closed. A single insert is mounted at an upper intersection between the ram cavity and throughbore as compared to also including a bottom insert and side inserts as defined in the specification. When the BOP is in the operating position, then the insert is mounted at the upper between the ram cavity and throughbore and does not include a bottom insert and side inserts as shown and defined in the specification.

Another object of the present invention is to provide a ram cavity with a single replaceable insert that can be replaced after BOP wear, which results in less work and fewer parts to repair the BOP.

Another object of the present invention is to avoid the entire prolonged process of welds and heat treatments to refurbish the ram cavity of a BOP.

Another object of the present invention is to provide a less expensive and reliable way to refurbish a BOP after it is worn and the rams do not seal within the BOP.

One general aspect includes a replaceable seat seal assembly for a used BOP including a BOP body that defines a throughbore and a ram cavity that intersects the throughbore. In one embodiment, the used BOP leaks between the rams and the throughbore. The ram cavity is machined to form a pocket or recess near the upper intersection of the throughbore and ram cavity before the seat seal is inserted into the recess. The upper intersection is the intersection that is highest when the BOP is mounted for operation, which is typically with the throughbore more or less typically vertical. The recess is limited in size to receive the insert. This forms a new seal that is good as or better than the original seal for the rams, with the same tolerances. However, the invention could also be used as part of a new BOP to provide replaceable insert that can be readily replaced in the field.

Implementations may include one or more of the following features: the replaceable seat seal assembly may have a recess which is limited to the size of a single piece insert. The single piece insert is mounted in the BOP without a side insert or bottom insert. The ram cavity may have a previously worn area where a recess is machined to remove the worn area of the ram cavity. The surface of the single piece insert in the recess is flush with a surface of the ram cavity. The single piece insert is the only insert mounted in the BOP. The single piece insert is positioned only at an upper intersection in the BOP. The method further includes providing that when the single piece insert is positioned in the recess then the surface of the single piece insert in the recess is flush with the surface of the ram cavity. The recess may be limited to the size of the single piece insert. The single piece insert is positioned only at an upper intersection in the BOP. The ram cavity may have a previously worn area in the ram cavity and machining a recess removes the worn area. The single piece insert is mounted in the BOP without a side insert or bottom insert. The single piece insert includes a non-metallic material. The single piece insert is the only insert mounted in the BOP. The single piece insert is positioned only at an upper surface of the ram cavity.

One general aspect includes the replaceable seat seal assembly where the single piece insert includes a non-metallic material.

Another general aspect includes a method for producing a BOP. The BOP includes a throughbore and a ram cavity that intersects the throughbore. The method includes the steps of: machining a recess at an intersection of the throughbore and the ram cavity. The recess includes a throughbore portion and a cavity portion. The cavity portion of the recess does not extend around the circumference of the ram cavity. The throughbore portion of the recess extends around a circumference of the throughbore. The method includes the step of inserting an insert into the recess. The insert, includes a body and a neck extending from the body. A neck seal ring on the neck seals with the throughbore portion of the recess. A cavity seal ring on the insert seals with the recess in the cavity portion of the recess. Fasteners mount in the body that engage the throughbore portion of the recess.

Implementations may include one or more of the following features: the method further including providing that when a single piece insert is positioned in the recess then the surface of the single piece insert in the recess is flush with the surface of the ram cavity. The recess may be limited to the size of the single piece insert. The single piece insert is positioned only at an upper intersection in the BOP. The ram cavity may have a previously worn area in the ram cavity and machining the recess removes the worn area. The single piece insert is mounted in the BOP without a side insert or bottom insert. The single piece insert may be a non-metallic material. The single piece insert is the only insert mounted in the BOP. The single piece insert is positioned only at an upper surface of the ram cavity.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE INVENTION

Detailed descriptions of an embodiment of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It will be appreciated that the descriptions of the single piece insert, top insert, bottom insert, and side inserts are described in the specification and claims in terms of the drawings made with reference to the BOP that assume the BOP is oriented with the throughbore more or less vertical. Terms such as top insert, bottom insert, and so forth may also be referred to as first insert, second insert, and the like. Likewise, when using directions such as upper, lower, side and the like, it is assumed for convenience in understanding that the BOP is oriented more or less vertically for reference as shown in the drawing. The actual BOP may be used vertically in operation or otherwise oriented for operation or transport. This also applies to such language if used in the claims. Side inserts are defined as being in the sides of the ram cavity along the throughbore. Bottom insert is defined as being at the lower intersection between the ram cavity and throughbore.

Figure 1:
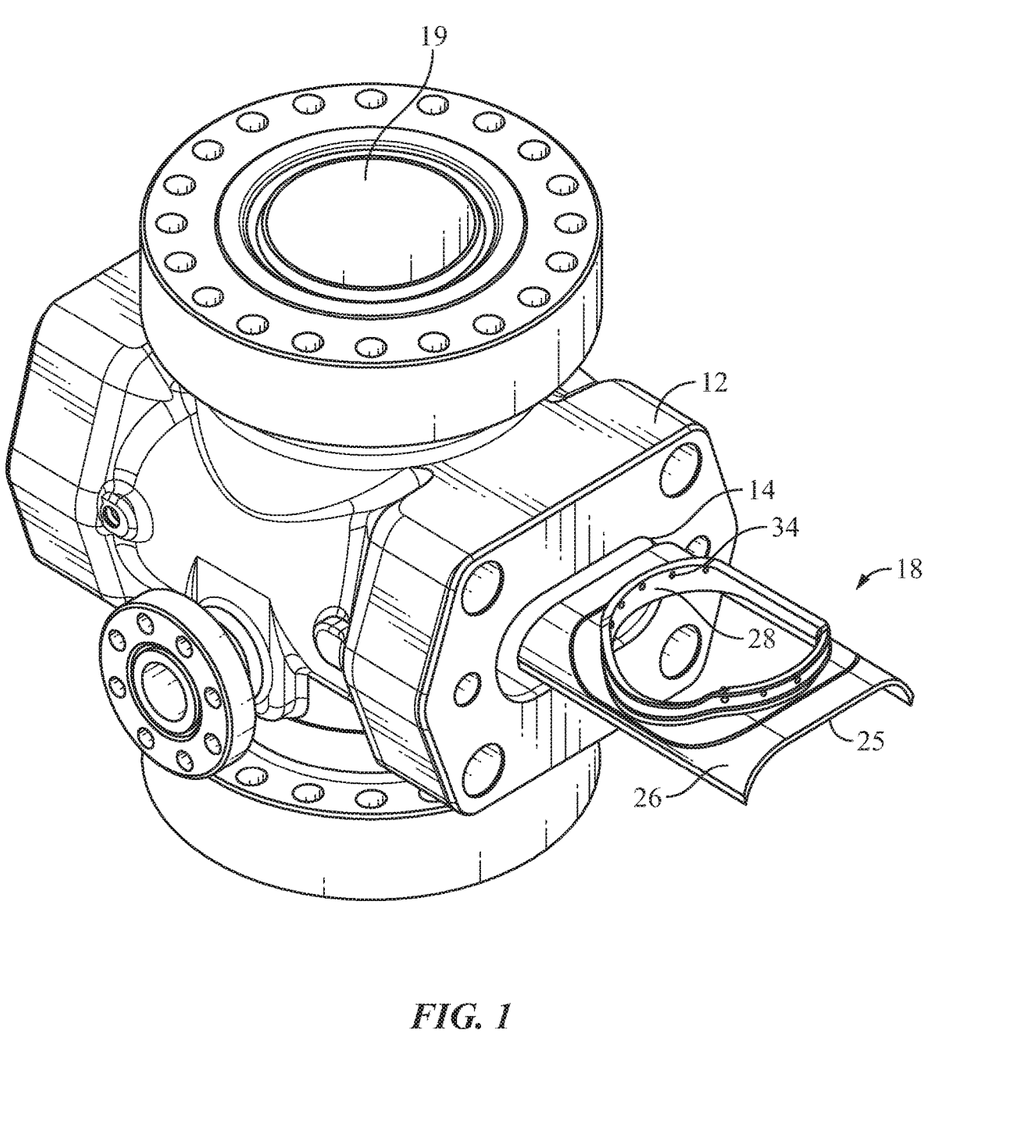
FIG. 1 is perspective view showing a single piece insert that is to be the replaceable seat seal assembly ready to be installed within a BOP in a recess in the ram cavity and throughbore in accord with one embodiment of the present invention.
Figure 8:
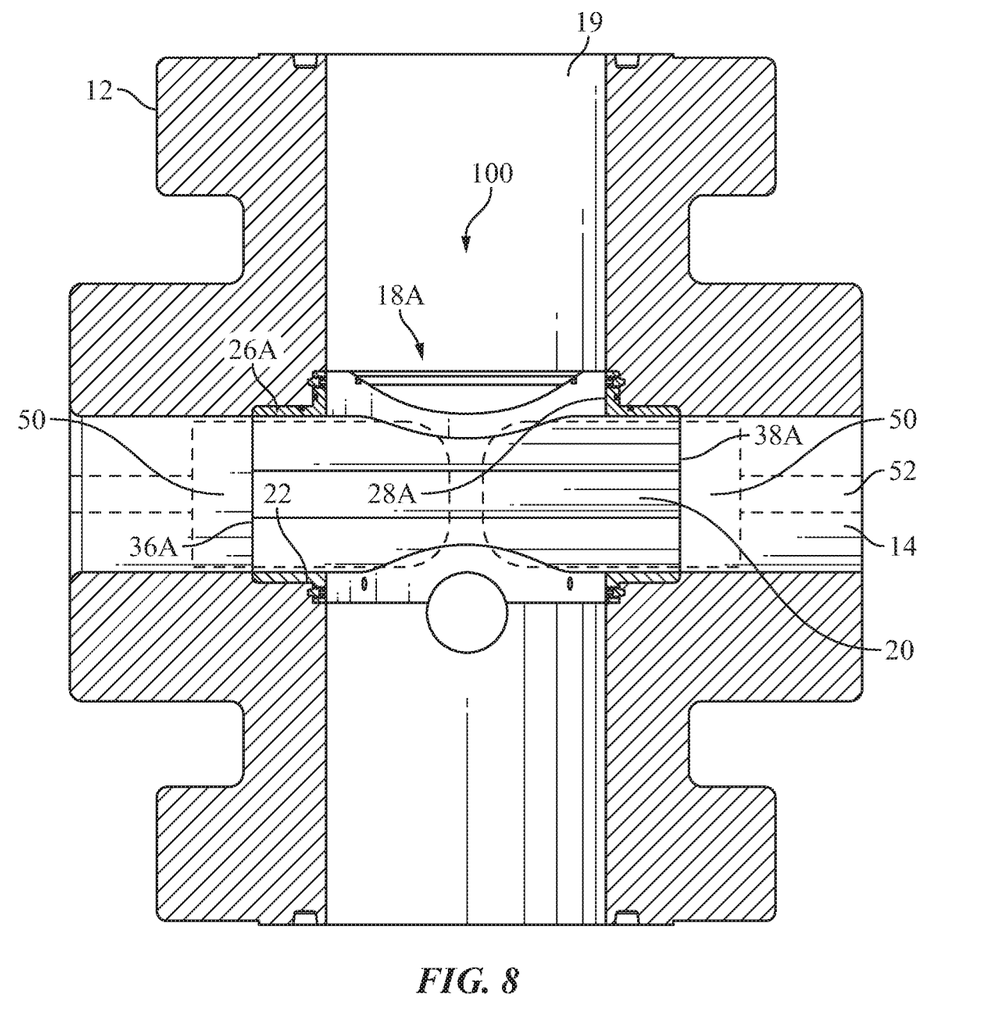
FIG. 8 is an elevational view in section which instead of a single piece insert shows a replaceable seal assembly with a plurality of inserts including side inserts, a top insert, and a bottom insert installed in a recess with rams in dash mounted in accord with one embodiment of the present invention.

FIG. 1 shows single piece insert 18 being introduced into BOP 12 via ram cavity 14. The single piece insert 18 is so named because the single piece insert 18 is the only insert utilized in BOP 12 as compared with a previous replaceable seat seal design as shown in FIG. 8 that requires a top insert, two side inserts and a bottom insert positioned around a circumference of the ram cavity 14.

A recess or pocket is machined into the BOP to receive single piece insert 18 within throughbore 19 and ram cavity 14 as discussed hereafter. The recess does not extend around the circumference of the ram cavity 14. Instead, it is limited to be adjacent the upper intersection of the throughbore 19 and ram cavity 14.

The neck 28 of the insert extends from the upper surface 26 of the body 25 of the single piece insert 18. Rams will seal with single piece insert 18 to seal throughbore 19 with respect to ram cavity 14 of the BOP 12. After the BOP is machined, the single piece insert 18 is replaceable at the wellsite whenever leakage occurs or as necessary. Once in position within the machined portion of the BOP shown in FIG. 5, single piece insert 18 is securely mounted.

Figure 2:
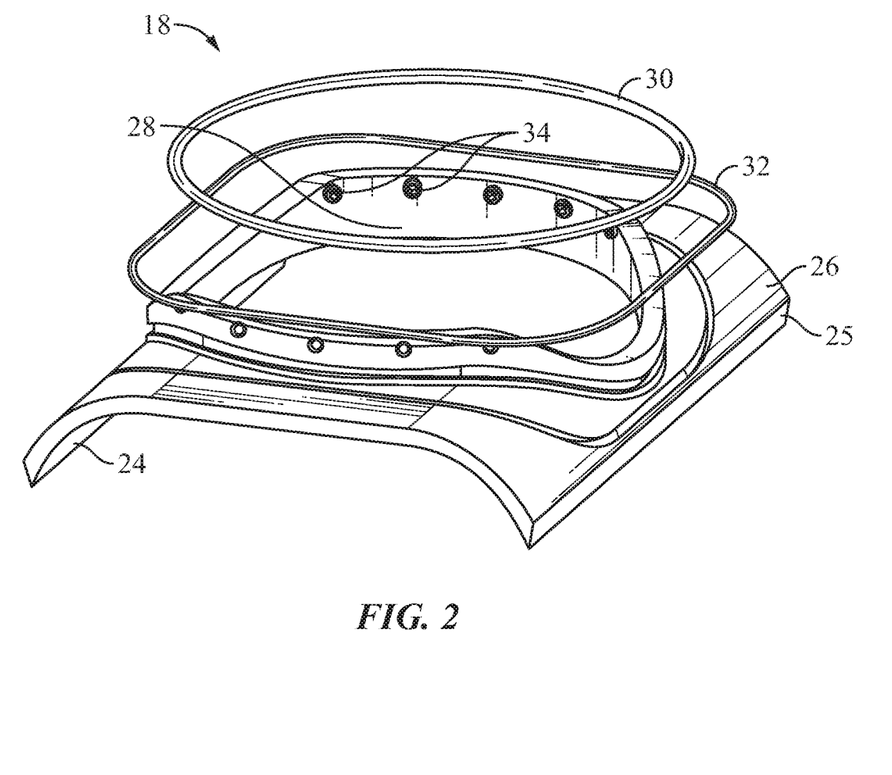
FIG. 2 is a perspective view prior to installation showing a single piece insert with O-rings not yet installed in accord with one embodiment of the present invention.
Figure 3:
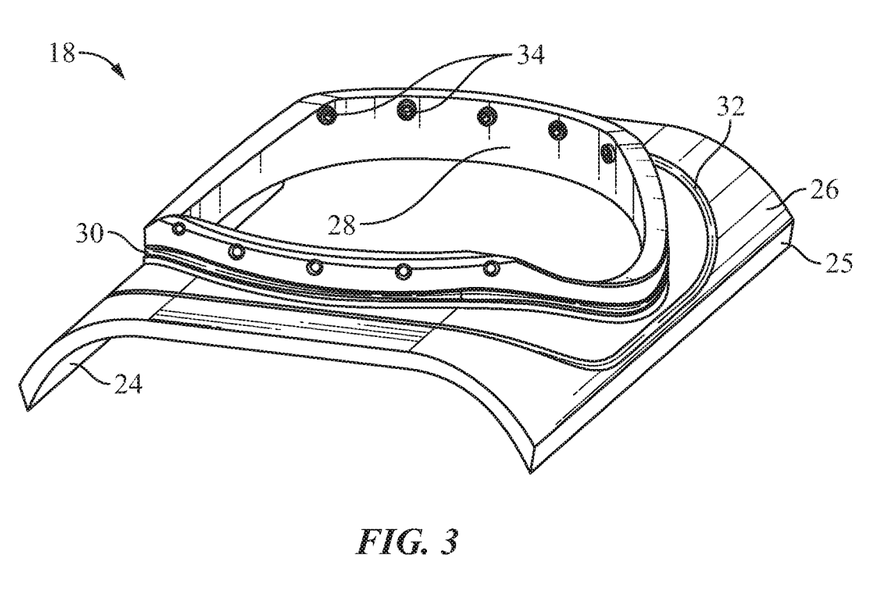
FIG. 3 is a perspective view of FIG. 2 with the O-rings and fasteners in position in accord with one embodiment of the invention.

Single piece insert 18 is shown in more detail in the perspective views of FIG. 2 and FIG. 3. Single piece insert 18 comprises a body 25 with an upper surface 26 that engages the machined pocket or recess 36 (See FIG. 4). The under surface 24 (See FIGS. 2-5) engages the rams within the ram cavity 14. Body 25 is generally U-shaped with short legs. Single piece insert neck 28 and single piece insert body 25 are molded as a one piece item that includes grooves for the O-rings as shown in FIG. 2 and FIG. 3.

Neck seal ring 30, which may comprise an O-ring or any other suitable seal ring, seals within throughbore 19 of BOP 12. Ram cavity seal ring 32 seals within the ram cavity 14. In this way, single piece insert 18 seals between the throughbore 19 and ram cavity 14. This prevents leakage between the throughbore 19 and ram cavity 14 past single piece insert 18 and the BOP 12 when the rams are present. The replaceable single piece insert 18 can be used to repair the leaks that otherwise occur between the rams and the damaged BOP ram cavity 14. Accordingly, these seals prevent leakage behind replaceable single piece insert 18 between ram cavity 14 and throughbore 19.

Fasteners 34, shown in FIGS. 1, 2 and 3, which may be grub screws or the like, are used to secure top insert neck 28 within their dedicated position in throughbore 19.

In one non-limiting embodiment, single piece insert 18 comprises non-metallic material, rubber, elastomeric or fluoroelastomer material such as Viton 90 Dura. As discussed above, single piece insert 18 is molded as one piece in one embodiment with the O-rings as additions to the O-ring. However, the invention is not limited to these materials and may be implemented in desired forms including but not limited to plastics, metal components, or other materials.

Figure 4:
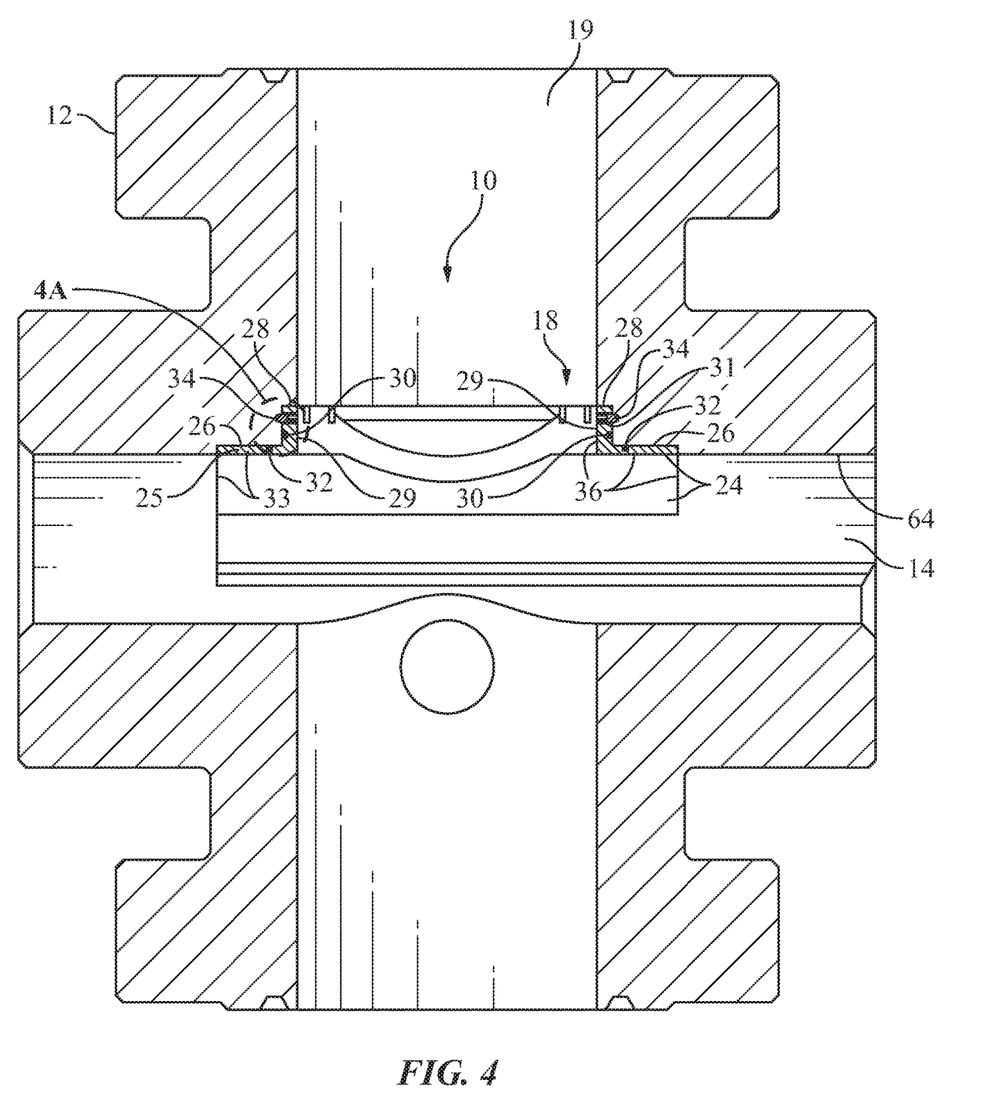
FIG. 4 is an elevational view showing the single piece insert installed into a recess of the BOP at an upper surface of the ram cavity and within the throughbore above the upper surface in accord with one embodiment of the invention.

FIG. 4 is a cross-section through ram cavity 14. FIG. 4 shows single piece insert assembly 10, which comprises single piece insert 18 installed into a pocket or recess 36 that is machined into BOP 12. The under surface or interior surface 24 of single piece insert 18 now forms the upper surface of ram cavity 14 that will engage the rams, when present. The under surface 24 of single piece insert 18 is flush with the remainder of ram cavity surface 64 when single piece insert 18 is positioned in the pocket or recess 36. The single piece insert 18 has a thickness that matches the depth of the recess so that single piece insert 18 fits flush with the ram cavity 14 within the interior of the BOP.

Figure 4A:
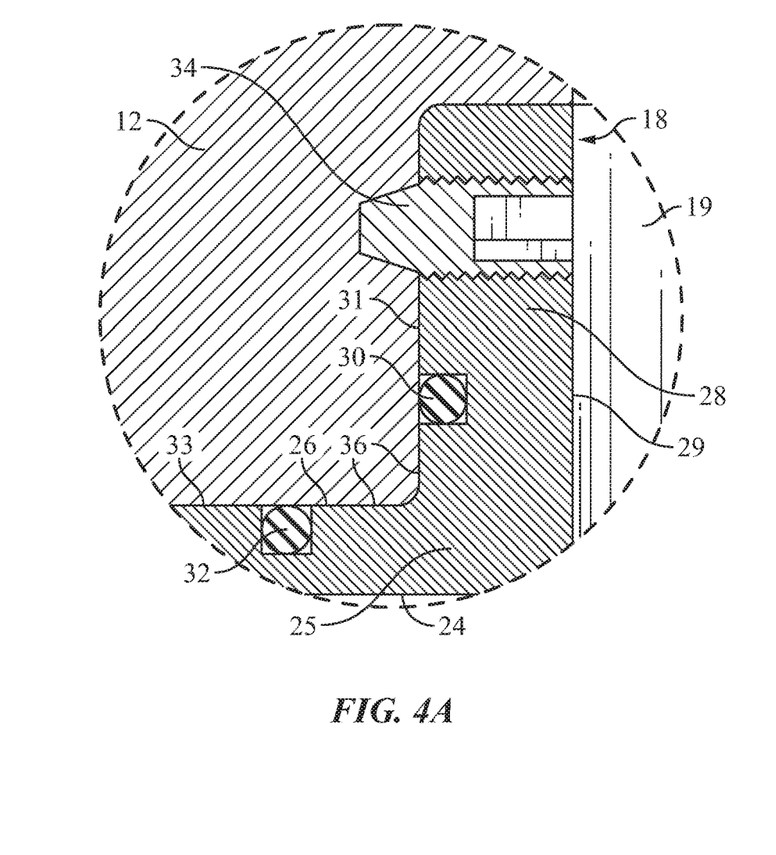
FIG. 4A is an elevational view in cross-section showing O-rings on the single piece insert that engage surfaces of the body of the BOP within the recess along the BOP ram cavity and the throughbore in accord with one embodiment of the invention.

Referring in more detail to FIG. 4A, neck 28 extends upwardly away from the upper surface 26 of single piece insert 18 and fits into recess or pocket 36 machined into throughbore 19. Neck seal ring 30 engages and seals with the surface 31 of the throughbore portion 29 of pocket 36. Cavity seal ring 32 engages and seals with the upper surface 26 of the ram cavity portion 33 of recess 36. Grub screws 34 mount single piece insert 18 within the neck portion of recess 36. The neck seal ring 30 and cavity seal ring 32 prevent leakage between ram cavity 14 and throughbore 19. Pocket or recess 36 comprises a throughbore portion 29 and a ram cavity portion 33, which receive the neck 28 and body 25 of single piece insert 18.

Figure 5:
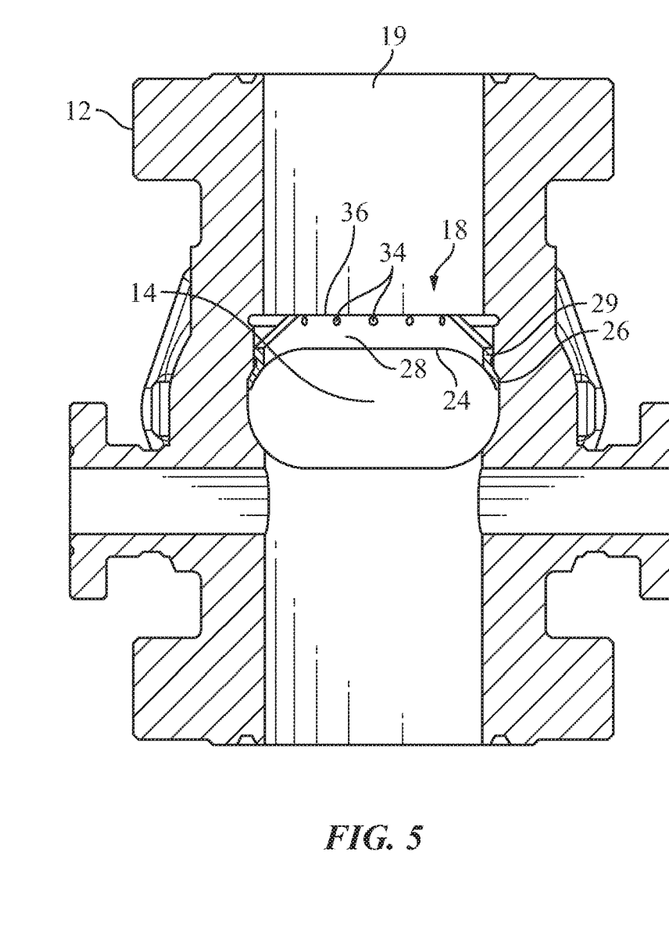
FIG. 5 is an elevational view in cross-section rotated ninety degrees from FIG. 4 showing the top insert positioned within a recess in the ram cavity in accord with one embodiment of the invention.

FIG. 5 shows a cross-section of BOP 12 with single piece insert 18 that looks through the ram cavity 14. This view is rotated 90 degrees from the view in FIG. 4. Recess 36, which receives the single piece insert 18, is machined into the intersection of the throughbore 19 and top of the ram cavity 14. FIG. 5, and also FIGS. 2 and 3, show that upper surface 26 is curved or otherwise shaped to fit within pocket or recess 36 that is machined into the BOP. Grub screws 34 attach neck 28 to the throughbore portion 29 of recess 36. Under surface 24 engages the rams when present within ram cavity 14. Under surface 24 is flush with the reminder of the surface 64 of the ram cavity 14 (See FIG. 4).

Figure 6:
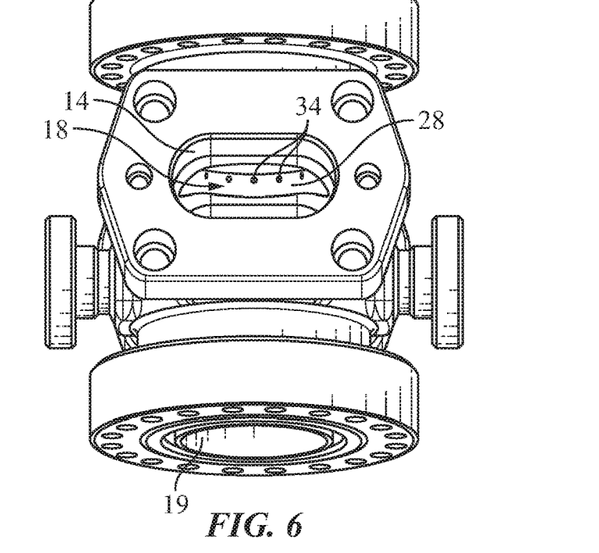
FIG. 6 is a perspective view looking through the ram cavity and showing the single piece insert mounted introduced into the BOP in accord with one embodiment of the invention.

FIG. 6 shows the single piece insert 18 through the ram cavity 14 as viewed from beneath the BOP 12. Neck 28 and grub screws 34 are visible from this view.

Figure 7:
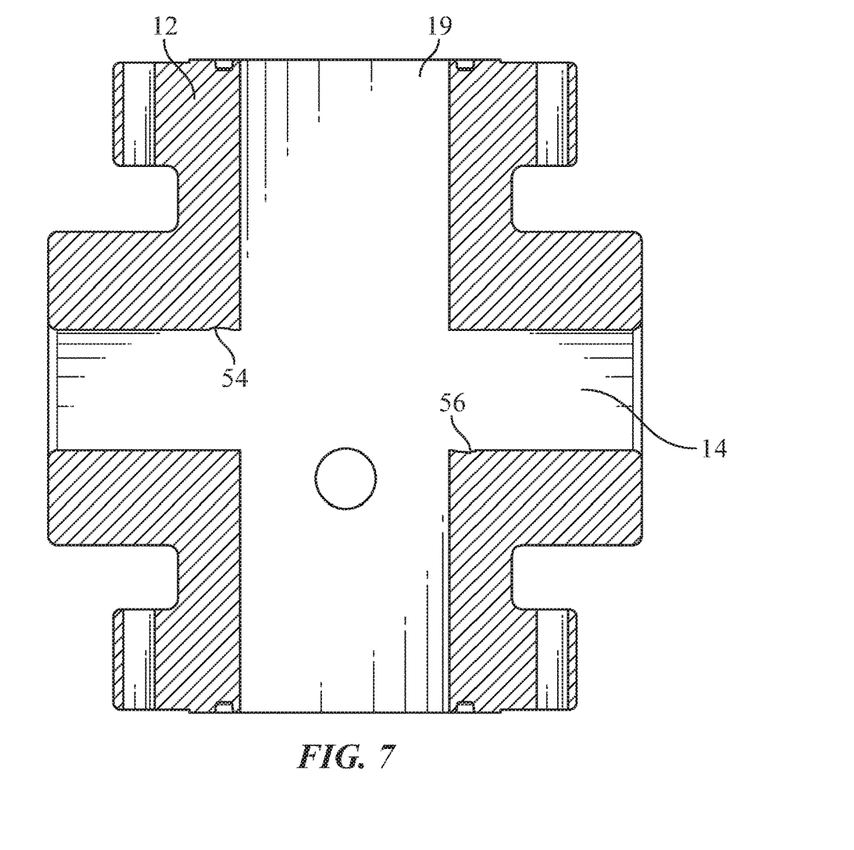
FIG. 7 is an elevational view in section of a BOP showing damage to the ram cavity in accord with one embodiment of the present invention.

It will be appreciated BOP 12 is a universal BOP that could be any type of BOP. The replaceable single piece insert 18 is used in BOPs that are damaged so that the rams no longer seal with the original ram cavity. See for example FIG. 7 that includes damage to the original ram cavity at 54 and 56. The damage of concern may typically comprise a worn area such as 54 in the ram cavity 14 that prevent adequate sealing between the BOP between rams (see for example rams 50 in a refurbished BOP of FIG. 8) and the BOP body. After the BOP is repaired and/or after the insert is replaced, then the same rams of the same ram size from before can be used. Accordingly leakage occurs between the throughbore 19 and ram cavity 14 past the rams. Rather than reworking the metal of the original ram cavity 14 as is done in the prior art, the original or worn ram cavity 14 and throughbore 19 are machined to form recess 36 (see FIGS. 4 and 4A) to accept replaceable single piece insert 18 and provide a seal between the rams and the throughbore 19. Recess 36 may also be referred to as single piece insert recess 36 because it is sized to contain only single piece insert 18. In other words, single piece insert recess 36 does not receive side inserts 20 or bottom insert 25 as discussed in FIG. 8. See for example rams 50 and 52 as used in a seal assembly that encircles the rams. In the present invention, it is only necessary to provide the seal with the rams and the single piece insert 18. Single piece insert 18 is an insert that comprises a neck and a body, and is the only replaceable insert positioned at an intersection of the ram cavity and throughbore. Namely it is positioned at the upper intersection when the BOP is in an operating position such as when the throughbore is vertical or substantially vertical. Other inserts as discussed with respect to FIG. 8 are not utilized at the lower intersection and at the sides of the ram cavity between the upper intersection and lower intersection. This make the present invention even more quickly and inexpensively repaired or made.

While the single piece insert assembly 10, namely the single piece insert and recess, can be used to repair a used BOP, in another embodiment, the single piece insert assembly 10 is mounted in a new BOP so that the advantages of the replaceable seat seal assembly are immediately available. In this case, BOPs with the replaceable seal assembly can be refurbished even at the rig site by replacement of the seal assembly.

Unlike the single piece insert 18 shown in FIG. 4, FIG. 8 shows a replaceable seat seal assembly 100 that comprises top insert 18A, two side inserts 20 and bottom insert 22. The side inserts are defined as inserts that are positioned in a recess between the upper intersection and lower intersection of the ram cavity and throughbore as shown in the drawings. Neither the side inserts nor their related recess are needed in this embodiment. The lower insert in FIG. 8 is defined as an insert that is positioned in a recess formed at the lower intersection of the ram cavity and throughbore. Neither the lower insert nor a corresponding recess is needed in this embodiment. Recess or pocket 36A extends around the circumference of ram cavity 14. FIG. 8 shows rams 50 and push rods 52 in dash that are mounted within a replaceable seat seal assembly 100 in accord with another embodiment of the present invention. The replaceable seat seal assembly 100 seals with rams 50 to prevent leakage between ram cavity 14 and throughbore 19. The top insert 18A seals with recess 36A, which is the metallic machined surface of BOP 12. Recess 36A is much larger than single piece insert recess 36 and extends around the entire circumference of the ram cavity 14. In other words, replaceable seal seat assembly 100 creates a new replaceable portion that seals with the rams, which is much larger than the single piece insert 18. In FIG. 4, recess 36 is limited in size to accept only the dimensions of single piece insert 18 in the throughbore 19 and ram cavity 14.

The depth of recess 36A that is machined into BOP 12 and thickness of the inserts that form inserted ram cavity 14 are preferably selected to result in the same internal dimensions of the original ram cavity. In other words, the inserts are flush with the remainder of the ram cavity. Accordingly, the same size rams can then be used in a BOP that utilizes the replaceable seat seal assembly. Accordingly, the rams 50 are the same size and construction as would normally be utilized in the original ram cavity of a BOP that did not use the replaceable seal seats 100 or single piece insert 18.

It will also be appreciated that while the present invention can be used to repair BOPs, the present invention could also be utilized in new BOPs to provide an inserted ram cavity that allows for replacing the components thereof in the field without the need for extensive heat treatments to the BOP 12 body.

Accordingly, the present invention provides a much less costly method for refurbishing a ram cavity or for building a new ram cavity. Once the replaceable seat seal assembly is installed, then future refurbishing of the ram cavity can be accomplished without extensive metal working and even may be accomplished at a work site or storage facility or the like.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A method for producing a BOP, said BOP comprising a throughbore and a ram cavity that intersects said throughbore, said method comprising the steps of:
   machining a recess at an intersection of said throughbore and said ram cavity, said recess comprising a throughbore portion and a cavity portion;
   providing that when said BOP is in an operating position then said recess is positioned at an upper intersection of said ram cavity and said throughbore;
   inserting an insert into said recess, said insert comprising a body and a neck extending from said body, providing that said insert is mounted in said BOP without a side insert or bottom insert;
   providing a neck seal ring on said neck that seals with said throughbore portion of said recess;
   providing a cavity seal ring on said insert that seals with said recess in said cavity portion of said recess; and
   providing fasteners that mount in said neck that engage said throughbore portion of said recess.

2. The method of claim 1, further comprising providing that neck portion of said recess extends around a circumference of said throughbore but said cavity portion of said recess does not extend around a circumference of said ram cavity.

3. The method of claim 1, further comprising said ram cavity previously comprised a worn area in said ram cavity and said machining removes said worn area.

4. The method of claim 3, further comprising utilizing a ram size previously used within said ram cavity.

5. The method of claim 1, further comprising providing that said insert comprises a non-metallic material.

6. The method of claim 1, further comprising providing that said insert is a single piece insert.

7. The method of claim 1, wherein said bottom insert that is not used is an insert at a lower intersection of said ram cavity and said throughbore, and said side insert that is not used is an insert between said upper intersection and said lower intersection.

8. The method of claim 1, wherein when said BOP is in said operating position, then said bottom insert is not mounted at a lower intersection of said throughbore and ram cavity, and said side insert is not mounted between said lower intersection and said upper intersection.

9. A replaceable seat seal assembly comprising:
   a BOP defining a throughbore and a ram cavity that intersects said throughbore;
   a recess at an intersection of said throughbore and said ram cavity, when said BOP is in an operating position then said recess is positioned at an upper intersection of said ram cavity and said throughbore;
   said recess comprising a throughbore portion of said recess in said throughbore;
   said recess comprising a cavity portion of said recess in said ram cavity;
   an insert that fits into said recess, said insert comprises a body and a neck extending from said body, said insert is mounted in said BOP without a side insert or bottom insert;
   said neck further comprises a neck seal ring that seals with said throughbore portion of said recess;
   said insert further comprising a cavity seal ring on a surface of said body that seals with said cavity portion of said recess; and
   fasteners that engage a surface of said throughbore portion of said recess that secure said neck of said insert within said throughbore portion of said recess.

10. The replaceable seat seal assembly of claim 9, wherein said recess extends around a circumference of said throughbore but does not extend around a circumference of said ram cavity.

11. The replaceable seat seal assembly of claim 9, wherein said insert comprises a non-metallic material.

12. The replaceable seat seal assembly of claim 9, wherein said ram cavity previously comprised a worn area and said recess is machined to remove said worn area.

13. The replaceable seat seal assembly of claim 9, wherein a surface of said insert in said recess is flush with a surface of said ram cavity.

14. The replaceable seat seal assembly of claim 9, wherein said insert is the only insert mounted in said BOP.

15. A method for producing a BOP, said BOP comprising a throughbore and a ram cavity that intersects said throughbore, said method comprising the steps of:
   machining a recess at an intersection of said throughbore and said ram cavity, said recess comprising a throughbore portion and a cavity portion;
   providing that said cavity portion of said recess does not extend around a circumference of said ram cavity;
   providing that said throughbore portion of said recess extends around a circumference of said throughbore;
   inserting an insert into said recess, said insert comprising a body and a neck extending from said body;
   providing a neck seal ring on said neck that seals with said throughbore portion of said recess;
   providing a cavity seal ring on said insert that seals with said recess in a cavity portion of said recess; and
   providing fasteners that mount in said neck that engage a surface of said throughbore portion of said recess.

16. The method of claim 15, further comprising providing that said insert is a single piece insert and when said single piece insert is positioned in said recess then a surface of said single piece insert in said recess is flush with a surface of said ram cavity.

17. The method of claim 15, further comprising providing when said BOP is in an operating position then said insert is in an upper intersection in said BOP.

18. The method of claim 15, further comprising providing said insert is the only insert mounted in said BOP.

* * * * *